United States Patent
Shi

(10) Patent No.: US 8,677,373 B2
(45) Date of Patent: Mar. 18, 2014

(54) COMPUTATION RESOURCE CONTROL APPARATUS, COMPUTATION RESOURCE CONTROL METHOD, AND NON-TRANSITORY COMPUTER-READABLE RECORDING MEDIUM

(75) Inventor: Meng Shi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 287 days.

(21) Appl. No.: 13/069,991

(22) Filed: Mar. 23, 2011

(65) Prior Publication Data

US 2011/0239223 A1 Sep. 29, 2011

(30) Foreign Application Priority Data

Mar. 24, 2010 (JP) ................................. 2010-068627
Sep. 21, 2010 (JP) ................................. 2010-211196

(51) Int. Cl.
*G06F 9/46* (2006.01)
(52) U.S. Cl.
USPC ......................................................... 718/104
(58) Field of Classification Search
USPC ......................................................... 718/104
See application file for complete search history.

(56) References Cited

U.S. PATENT DOCUMENTS 5,799,173 A * 8/1998 Gossler et al. .................. 703/21

FOREIGN PATENT DOCUMENTS

| JP | 2000-357100 A | 12/2000 |
| JP | 2004-070845 A | 3/2004 |
| JP | 2007-200128 A | 8/2007 |

* cited by examiner

*Primary Examiner* — Mengyao Zhe
(74) *Attorney, Agent, or Firm* — Sughrue Mion, PLLC

(57) ABSTRACT

A computation resource control apparatus includes an activation unit, a first queue managing unit, an allocating unit and a second queue managing unit. The activation unit activates a computation resource being in a stop state in accordance with a computation request. The first queue managing unit adds the computation resource which is being activated to a first queue. The allocating unit allocates the computation resource, which is output from the first queue, to the computation request to execute a computation process corresponding to the computation request. The second queue managing unit adds the computation resource which has completed the computation process to a second queue and places the computation resource, which is output from the second queue, in the stop state.

13 Claims, 6 Drawing Sheets

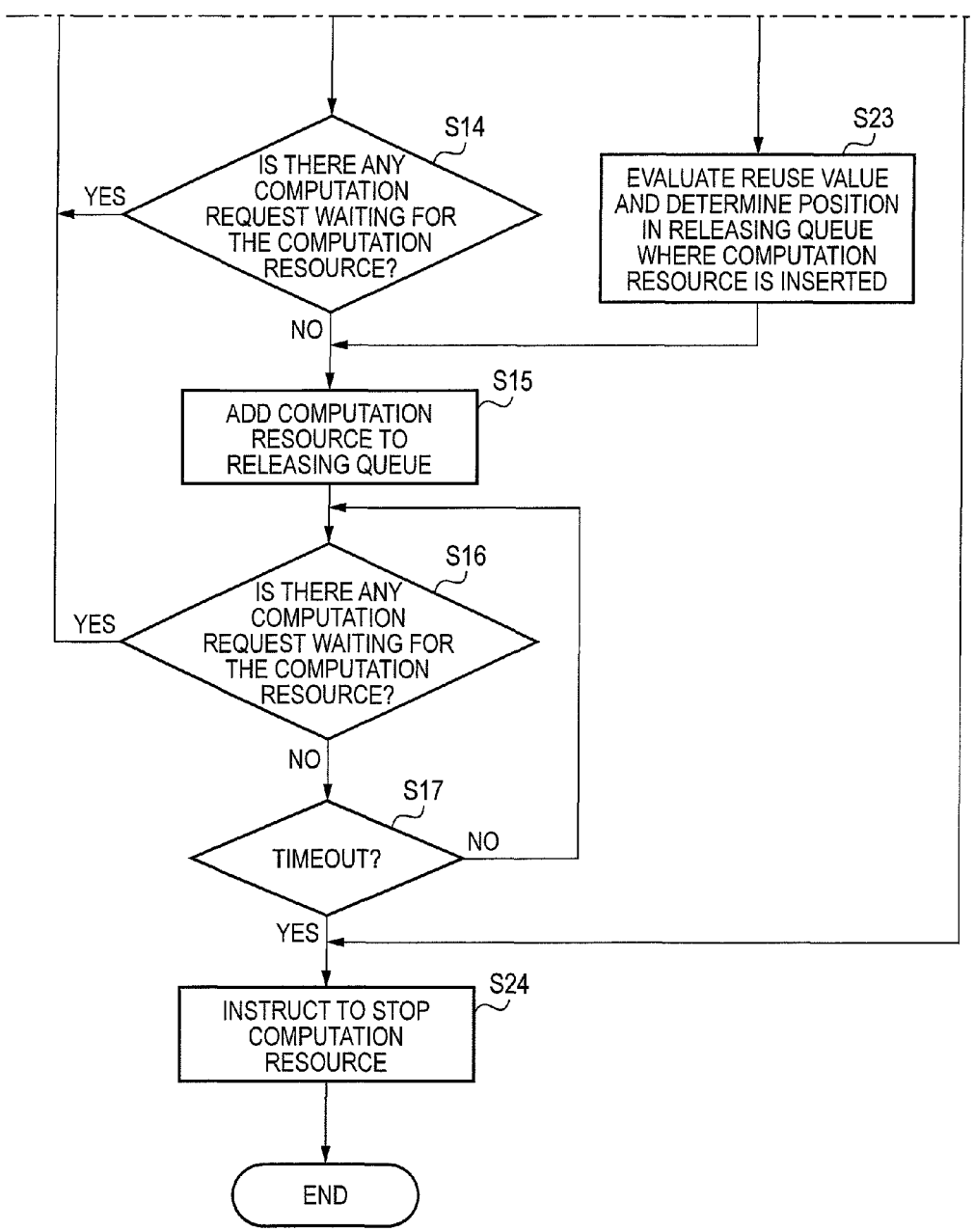
(FIG. 4 Continued)

though it may be constituted by the other storage device. The storage section 41 stores various data and programs. The communication section 42 is constituted by a NIC (Network Interface Card) or the like and performs communication via a network.

COMPUTATION RESOURCE CONTROL APPARATUS, COMPUTATION RESOURCE CONTROL METHOD, AND NON-TRANSITORY COMPUTER-READABLE RECORDING MEDIUM

CROSS-REFERENCE TO RELATED APPLICATIONS

This application is based on and claims priority under 35 USC 119 from Japanese Patent Application No. 2010-68627 filed Mar. 24, 2010 and Japanese Patent Application No. 2010-211196 filed Sep. 21, 2010.

BACKGROUND

Technical Field

The invention relates to a computation resource control apparatus, a computation resource control method, and a non-transitory computer-readable recording medium storing a program that causes a computer to execute a computation resource control process.

SUMMARY

According to an aspect of the invention, a computation resource control apparatus includes an activation unit, a first queue managing unit, an allocating unit and a second queue managing unit. The activation unit activates a computation resource being in a stop state in accordance with a computation request. The first queue managing unit adds the computation resource which is being activated to a first queue. The allocating unit allocates the computation resource, which is output from the first queue, to the computation request to execute a computation process corresponding to the computation request. The second queue managing unit adds the computation resource which has completed the computation process to a second queue and places the computation resource, which is output from the second queue, in the stop state.

BRIEF DESCRIPTION OF THE DRAWINGS

Exemplary embodiments of the invention will be described in detail below based on the accompanying drawings, wherein.

DETAILED DESCRIPTION (Configuration of Computation Resource Control System)

Figure 1:
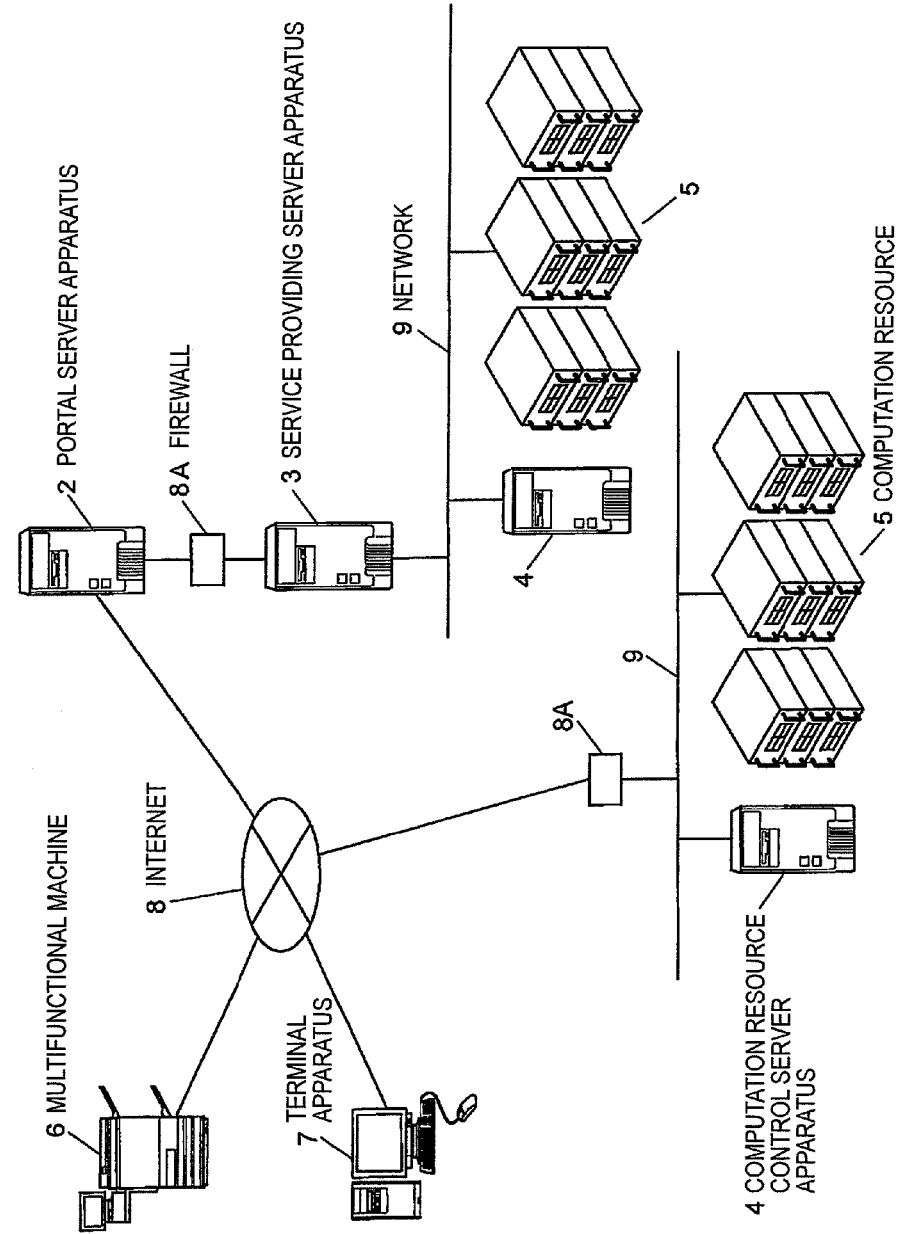
FIG. 1 is a view showing an example of the configuration of a computation resource control system according to an exemplary embodiment of the invention.

FIG. 1 is a view showing an example of the configuration of a computation resource control system according to an exemplary embodiment of the invention.

A computation resource control system 1 includes a portal server apparatus 2, a service providing server apparatus 3, a computation resource control server apparatus 4, computation resources 5, a multifunctional machine 6, a terminal apparatus 7 and so on, all of which are connected by the Internet 8 so as to be able to communicate with each other. The computation resource control server apparatus 4 and the computation resources 5 are connected to each other by a network 9. Communication from an external apparatus to each of the computation resource control server apparatus 4 and the computation resources 5 is restricted by a firewall 8A.

The portal server apparatus 2 provides a portal site or the like to guide a service of the service providing server apparatus 3 for a client such as the multifunctional machine 6 and/or the terminal apparatus 7.

The service providing server apparatus 3 receives a request from the multifunctional machine 6 or the terminal apparatus 7, operates a Web application or the like, and causes the computation resources 5 secured by the computation resource control server apparatus 4, which will be described later, to execute a computation request required for the operation of the Web application or the like.

The computation resource control server apparatus 4 controls states of the computation resources by activating, releasing and stopping the computation resources 5.

Each of the computation resources 5 is provided with plural information processing apparatuses such as computers whose resources which include memory capacity, hard disk capacity, CPU (Central Processing section) processing power, network speed and so on are allocated and used in the computation requests of the service providing server apparatus 3.

The multifunctional machine 6 is a client apparatus for the service providing server apparatus 3 and includes a printing part, an optical scanning part, a facsimile part, a display part such as an LCD (Liquid Crystal Display), an operation part having plural operation keys and so on. The multifunctional machine 6 requests the service providing server apparatus 3 to execute a Web application according to user's operation of the operation part and displays images for use in operation and the like on the display part according to a computation result of the service providing server apparatus 3. In addition, the multifunctional machine 6 may operate the optical scanning part, the printing part, the facsimile part and so on according to the computation result. Moreover, the multifunctional machine 6 may be configured as not only a single unit but also plural units corresponding to various functional parts.

The terminal apparatus 7 is a client apparatus for the service providing server apparatus 3, like the multifunctional machine 6, and includes a display part such as an LCD, an operation part such as a keyboard, a mouse or the like, and a control part constituted by a CPU or the like. The terminal apparatus 7 requests the service providing server apparatus 3 to execute a Web application according to user's operation of the operation part and displays images for use in operation and the like on the display part according to a computation result of the service providing server apparatus 3.

Figure 2:
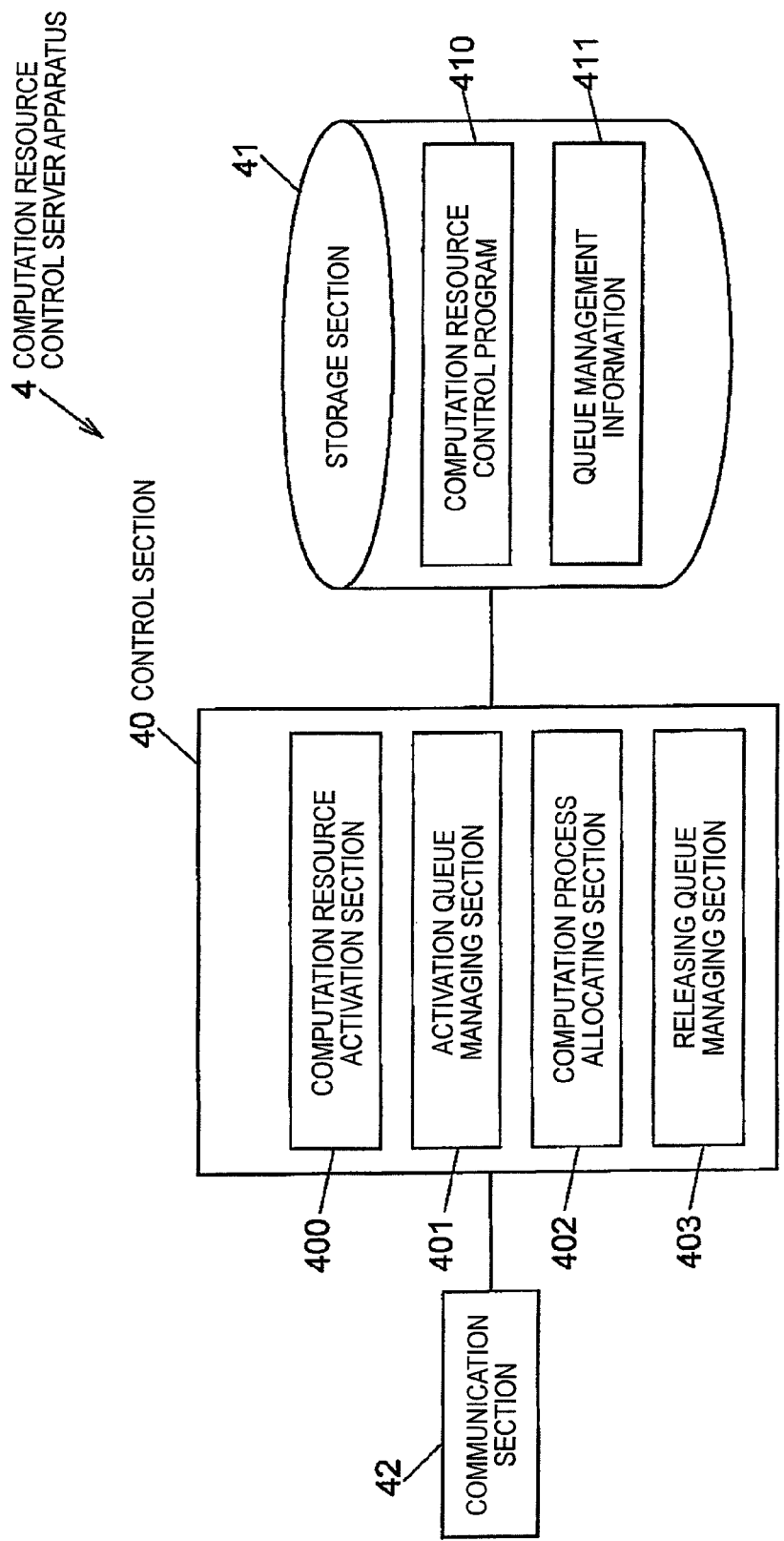
FIG. 2 is a block diagram showing an example of the configuration of a computation resource control server apparatus.

FIG. 2 is a block diagram showing an example of the configuration of the computation resource control server apparatus 4.

The computation resource control server apparatus 4 includes a control section 40, a storage section 41, and a communication section 42. The control section 40 is constituted by a CPU and the like and controls various parts and executing various programs. The storage section 41 is constituted by a storage device such as a HDD (Hard Disk Drive), a flash memory or the like and stores information. The communication section 42 communicates with an outside through the Internet 8.

The control section 40 functions as a computation resource activation section 400, an activation queue managing section 401, a computation process allocating section 402, a releasing queue managing section 403 and so on by executing a computation resource control program 410.

The computation resource activation section 400 transmits an activation instruction to the computation resource 5 according to a computation request from the service providing server apparatus 3.

The activation queue managing section 401 adds the computation resource 5, which is brought by the computation resource activation section 400 to be ready to be activated, to an activation queue.

The computation process allocating section 402 places the computation resources 5, which have been activated in the activation queue, in a executable state in a queue order, and allocates the computation resources 5 to the computation requests from the service providing server apparatus 3 to execute computation processes.

The releasing queue managing section 403 releases the computation resource 5 which has completed the computation process of the computation request or the computation resource 5 which has been in the executable state for a predetermined time period, adds the released computation resource 5 to a releasing queue, and places the computation resources 5 in a stop state after a predetermined time period has elapsed.

The storage section 41 stores the computation resource control program 410, which causes the control section 40 to function as the above-mentioned sections 400 to 403, and information such as queue management information 411 and the like.

(Operation)

An operation of the computation resource control system will be hereinafter described with reference to the accompanying drawings.

(1) Basic Operation of the Computation Resource Control System

First, a user operates the multifunctional machine 6 or the terminal apparatus 7 in order to use a Web application. The multifunctional machine 6 or the terminal apparatus 7 communicates with the service providing server apparatus 3 through the Internet 8 and the portal server apparatus 2 and requests the service providing server apparatus 3 to activate the Web application.

The service providing server apparatus 3 receives the request from the multifunctional machine 6 or the terminal apparatus 7 and activates the Web application.

The Web application generates image information and so on to be displayed on the display part of the multifunctional machine 6 or the terminal apparatus 7 and transmits the generated image information and so on to the multifunctional machine 6 or the terminal apparatus 7 according to the request from the multifunctional machine 6 or the terminal apparatus 7. The multifunctional machine 6 or the terminal apparatus 7 receives the image information and so on and displays images on the display part. In addition, the Web application transmits an execution result of a particular program and so on to the multifunctional machine 6 or the terminal apparatus 7, and the multifunctional machine 6 or the terminal apparatus 7 operates based on the execution result of the program.

The user uses the Web application through repetition of the above-described operation.

The Web application of the service providing server apparatus 3 performs its operation by requesting the computation resource control server apparatus 4 to execute a computation process. The computation resource control server apparatus 4 executes the computation process by allocating the computation resources according to the computation request. If there are plural computation requests, the Web application adds the computation requests to a computation request queue $S_5$ (FIG. 3) in an order of generation of the computation requests, and applies the computation requests to the computation resources 5 in order.

(2) Operation of the Computation Resource Control Server Apparatus

Figure 4:
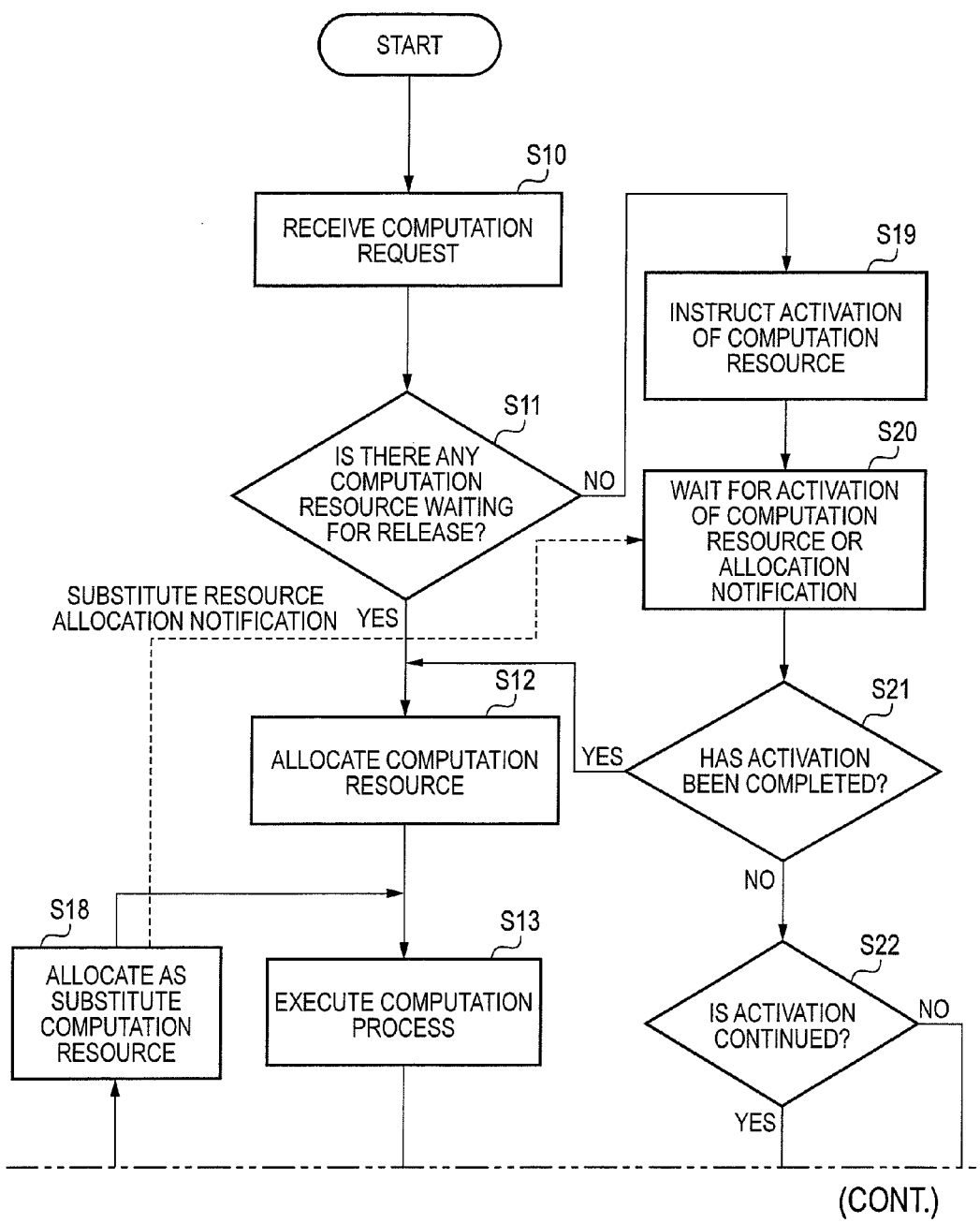
FIG. 4 is a flow chart showing an example of an operation of the computation resource control server apparatus.

FIG. 4 is a flow chart showing an example of an operation of the computation resource control server apparatus 4.

Figure 3:
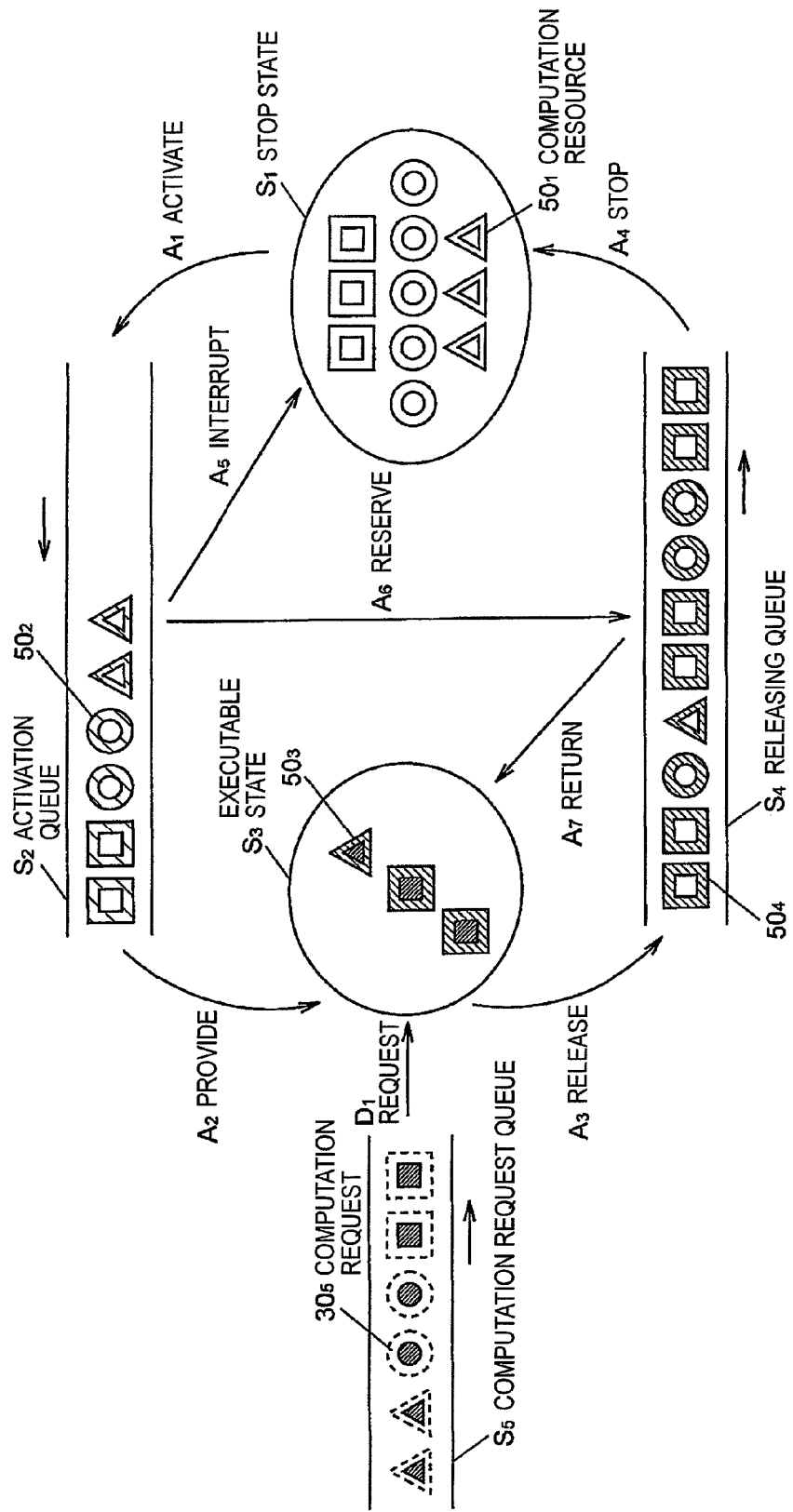
FIG. 3 is a view for explaining a state transition of a computation resource 5 controlled by the computation resource control server apparatus.

FIG. 3 is a view for explaining a state transition of the computation resources 5 controlled by the computation resource control server apparatus 4.

Different types of hatchings of computation resources $50_1$ to $50_4$ indicate respective states of the computation resources 5. In addition, different shapes of computation resources $50_1$ to $50_4$ indicates types of computation requests which computation resources $50_1$ to $50_4$ can deal with or processing power required for the computation requests. It is assumed here that each of the computation resources $50_1$ to $50_4$ deals with only computation requests $30_5$ having the identical shape.

At first, the computation process allocating section 402 of the computation resource control server apparatus 4 receives a computation request from the service providing server apparatus 3 (S10).

At step S11, the computation process allocating section 402 of the computation resource control server apparatus 4 confirms if there is any computation resource $50_4$ in a releasing queue $S_4$ whose type is identical with that of the received computation request. If there is no such a computation resource (No at S11), the computation resource activation section 400 instructs to activate ($A_1$) a computation resource $50_1$, whose type is identical with that of the received computation request, from among computation resources $50_1$ in a stop state $S_1$ (S19) and adds the received computation request to the tail end of a computation queue $S_5$ as a computation request $30_5$.

The activation queue managing section 401 adds a computation resource $50_2$ which has been activated by the computation resource activation section 400 to the tail end of an activation queue $S_2$ and await until, for example, ten minutes elapses or until a substitute computation resource allocation notification which will be described later is received (S20). If a predetermined time elapses or if receiving the substitute computation resource allocation notification, the activation queue managing section 401 confirms as to whether or not activation of the computation resource $50_2$ in interest is completed. If the activation of the computation resource $50_2$ is completed (Yes at S21), a computation request $30_5$ corresponding to the activated computation resource $50_2$ is taken out from the computation queue $S_4$, and the activated computation resource $50_2$ is provided ($A_2$) so as to be in a executable state $S_3$ (that is, the computation resource $50_2$ is set to a computation resource $50_3$) and to be allocated to the taken out computation request $30_5$ (S12). The computation resource 503 executes a computation process (S13).

At S11, if there is a computation resource $50_4$ in the releasing queue $S_4$ whose type is identical with that of the received computation request (Yes at S11), the computation process allocating section 402 of the computation resource control server apparatus 4 returns ($A_7$) the computation resource $50_4$ whose type is identical with the received computation request to the executable state $S_3$ so that it is set to a computation resource $50_3$, and allocates the returned ($A_7$) computation resource $50_3$ to the received computation request (S12). The computation resource $50_3$ to which the received computation request is allocated executes a computation process (S13). If there are plural computation resources $50_4$ whose types are identical with that of the received computation request, the computation request may be allocated to the computation resource $50_4$ which is the closest to the front of the releasing queue $S_4$.

When the computation process is completed by the computation resource $50_3$ (S13), the computation process allocating section 402 of the computation resource control server apparatus 4 checks the computation request waiting queue $S_5$ to confirm whether or not there is a computation request $30_5$ whose type is identical with that of the computation resource $50_3$, which has just completed the computation process. If there is such a computation a computation request $30_5$ in the computation request waiting queue $S_5$ whose type is identical with that of the computation resource $50_3$, which has just completed the computation process (Yes at S14), the computation resource $50_3$ is allocated to the computation request $30_5$ as a substitute computation resource for a computation resource $50_2$ which is waiting activation in the activation queue $S_2$, and it is notified to the activation queue managing section 401 that the computation resource $50_3$ is allocated to the computation request $30_5$ as the substitute computation resource for the computation resource $50_2$ which is waiting activation in the activation queue $S_2$ (substitute resource allocation notification) (S18). If there are plural computation requests $30_5$ in the computation request queue $S_5$ whose types are identical with that of the computation resource $50_3$, which has just completed the computation process, the computation request $30_5$ which is the closest to the front of the computation request queue $S_5$ may be allocated to the computation resource $50_3$, which has just completed the computation process.

If there is no computation request $30_5$ in the computation request queue $S_5$ whose type is identical with that of the computation resource $50_3$, which has just completed the computation process (No at S14), the computation resource $50_3$ is released ($A_3$), and the releasing queue managing section 403 adds the computation resource $50_3$ to the tail end of the releasing queue $S_4$ (S15).

If there is no computation request $30_5$ in the computation request queue $S_5$ whose type is identical with any of those of the computation resources $50_4$ in the releasing queue $S_4$ (No at S16) and if a predetermined time period (for example, 20 minutes) has elapsed since one computation resource $50_4$ is added to the releasing queue $S_4$ (Yes in S17), the releasing queue managing section 403 stops ($A_4$) the computation resource $50_4$ and places the computation resource $50_4$ in the stop state $S_1$ (S24). The time period from the addition of the computation resource $50_4$ to the releasing queue $S_4$ to the pausing ($A_4$) of the computation resource $50_4$ is changeable and may be changed either automatically or by user's operation depending on the type of Web application and/or the usage purpose of the computation resources 5.

At Step S16, if there is a computation request $30_5$ in the computation request queue $S_5$ whose type is identical with that of any of the computation resources $50_4$ in the releasing queue $S_4$ (Yes at S16), the releasing queue managing section 403 returns ($A_7$) the computation resource $50_4$ to the executable state $S_3$ (that is, sets the computation resource $50_4$ to the computation resource $50_3$), and the computation process allocating section 402 allocates the computation request $30_5$ thereto and notifies the activation queue managing section 401 that the computation resource $50_3$ is allocated to the computation request $30_5$ as a substitute computation resource for the computation resources $50_2$ which wait for activation in the activation queue $S_2$ (substitute resource allocation notification) (S18).

If a computation resource $50_2$ has not yet been activated, that is, if the substitute resource allocation notification is received during S20 (NO at S21), the activation queue managing section 401 determines as to whether or not the activation of the computation resource $50_2$ should be continued. If the activation queue managing section 401 determines that the activation of the computation resource $50_2$ should be continued (Yes at S22), the computation resource $50_2$ is reserved ($A_6$), reuse value of the computation resource $50_2$ is evaluated, and an insertion position in the releasing queue S4 where the computation resource $50_2$ is inserted is determined (S23).

It is assumed that t denotes an elapsed time after the computation resource $50_2$ is added to the activation queue $S_2$, a condition for determining at step S21 that the activation should be continued is to meet the following conditional expression 1.

$$t \geq f(p(i))t_c \tag{1}$$

where p(i) denotes a probability that a computation request occurs whose type is identical with the computation resource $50_2$, f(x) denotes a function which is in inverse proportion to x in an interval (0<x<1), and $t_c$ denotes a fixed value.

The insertion position in the releasing queue $S_4$ which is determined at step S22 is determined based on reuse value $v_R$ which is defined by the following expression (2).

$$v_R = V(g(t_a(i)), p(i)) \tag{2}$$

where $t_a(i)$ denotes the elapsed time from previous computation process of the computation request whose type is identical with the computation resource $50_2$, and V(x,y) and g(x) are increasing functions.

If the activation queue managing section 401 determines that the activation of the computation resources $50_2$ is not continued (No at S22), the activation queue managing section 401 interrupts ($A_5$) the activation of the computation resource $50_2$ and places the computation resource $50_2$ in the stop state $S_1$ again (S24).

It is assumed that t denotes the elapsed time after the computation resource $50_2$ is added to the activation queue $S_2$, a condition for determining at step S21 that the activation should be stopped is to meet the following conditional expression (3).

$$t < f(p(i))t_c \tag{3}$$

(3) Latency Until Computation Resource Allocation

Figure 5A:
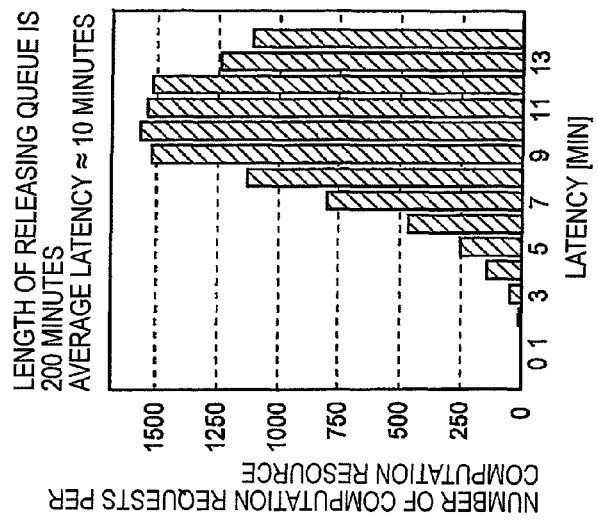
FIGS. 5A to 5C are graphs showing simulation results of a relationship between the number of computation requests received by the computation resource control server apparatus and a required latency from the occurrence of the computation requests to computation processing of the computation requests.
Figure 5B:
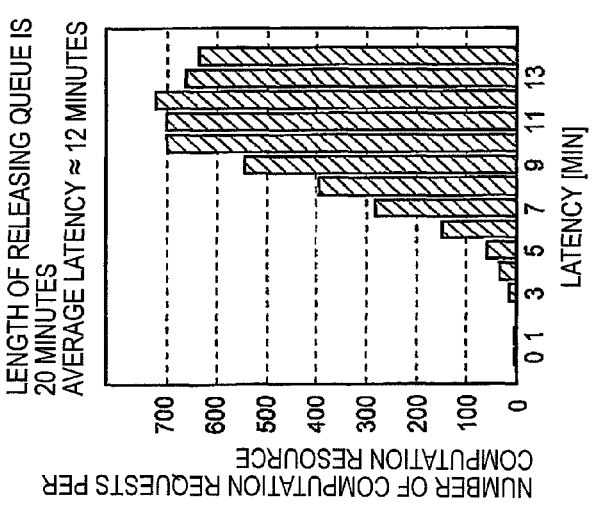
Figure 5C:
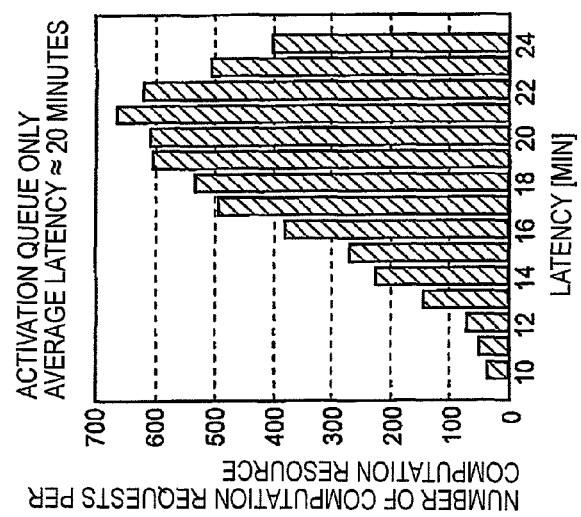

FIGS. 5A to 5C are graphs showing simulation results of a relationship between the number of computation requests received by the computation resource control server apparatus 4 and a required latency from the occurrence of the computation requests to computation processing of the computation requests.

FIG. 5A shows a simulation result of the case where, after a computation resource $50_3$ in the executable state $S_3$ has completed a computation process, a computation request $30_5$ of the same type does not occur for a certain time period and where the computation resource transitions from the executable state $S_3$ to the stop state $S_1$ without going through the releasing queue $S_4$. In this case, an average latency required from the occurrence of the computation request to computation processing of the computation request is about 20 minutes.

FIG. 5B shows a simulation result of the case where a time period until a computation resource $50_4$ is stopped ($A_4$) after it is added to the releasing queue $S_4$ is set to 20 minutes. In this case, an average latency required from the occurrence of the computation request to computation processing of the computation request is about 12 minutes.

FIG. 5C shows a simulation result of the case where a time period until a computation resource $50_4$ is stopped ($A_4$) after it is added to the releasing queue $S_4$ is set to 200 minutes. In this case, an average latency required from the occurrence of the computation request to computation processing of the computation request is about 10 minutes, which is shorter than that shown in FIG. 5B.

However, in the case shown in FIG. 5C where the length of the releasing queue is 200 minutes, that is, is long, in a system which charges users for the state where the computer resources are running, that is, the state other than the stop state $S_1$, an excessive length of the releasing queue would generally increase operation costs. In view of the above, a user of the computation resource control system 1 adjusts the system with a balance between the length of the releasing queue and the average latency.

[Other Exemplary Embodiments]

It should be noted that the invention is not limited to the above-described exemplary embodiments, and various modifications thereof may be made without departing from the spirit and scope of the invention.

The computation resource control program 410 employed in the above exemplary embodiments may be read from a storing medium such as a CD-ROM into a storage of the computation resource control apparatus or may be downloaded from a server apparatus or the like connected to a network such as the Internet into the storage of the computation resource control apparatus. Some or all of the sections 400 to 403 employed in the above exemplary embodiments may be implemented by hardware such as ASIC and so on.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A computation resource control apparatus comprising:
at least one processor which executes:
an activation unit that activates a computation resource being in a stop state in accordance with a computation request;
a computation queue managing unit that adds the computation resource which is being activated to a computation queue;
an allocating unit that allocates the computation resource, which is output from the computation queue, to the computation request to execute a computation process corresponding to the computation request; and
a releasing queue managing unit that if there is no computation request in the computation queue using the computation resource which has completed the computation process, adds the computation resource which has completed the computation process to a releasing queue and, if a predetermined time period has elapsed since the computation resource is added to the releasing queue, places the computation resource, in the stop state.

2. The computation resource control apparatus according to claim 1, wherein if a computation request corresponding to the computation resource added to the releasing queue is received, the releasing queue managing unit allocates the computation resource corresponding to the received computation request to the received computation request to execute a computation process corresponding to the received computation request.

3. The computation resource control apparatus according to claim 1, wherein the computation queue managing unit evaluates reuse value of the computation resource added to the computation queue and determines a position where the added computation resources is added to the releasing queue.

4. The computation resource control apparatus according to claim 1, wherein if reuse value of the computation resource is lower than predetermined value, the computation queue managing unit places the computation resource which is being activated in the stop state.

5. A computation resource control method comprising:
activating a computation resource being in a stop state in accordance with a computation request;
adding the computation resource which is being activated to a computation queue;
allocating the computation resource, which is output from the computation queue, to the computation request to execute a computation process corresponding to the computation request;
adding the computation resource which has completed the computation process to a releasing queue if there is no computation request in the computation queue using the computation resource which has completed the computation process; and
placing the computation resource, in the stop state if a predetermined time period has elapsed since the computation resource is added to the releasing queue.

6. The method according to claim 5, further comprising:
if a computation request corresponding to the computation resource added to the releasing queue is received, allocating the computation resource corresponding to the received computation request to the received computation request to execute a computation process corresponding to the received computation request.

7. The method according to claim 5, further comprising:
evaluating reuse value of the computation resource added to the computation queue; and
determining a position where the added computation resources is added to the releasing queue.

8. The method according to claim 5, further comprising:
if reuse value of the computation resource is lower than predetermined value, placing the computation resource which is being activated in the stop state.

9. A non-transitory computer-readable recording medium storing a computer to execute a computation resource control process, the process comprising:
activating a computation resource being in a stop state in accordance with a computation request;
adding the computation resource which is being activated to a computation queue;
allocating the computation resource, which is output from the computation queue, to the computation request to execute a computation process corresponding to the computation request;

adding the computation resource which has completed the computation process to a releasing queue if there is no computation request in the computation queue using the computation resource which has completed the computation process; and placing the computation resource, in the stop state if a predetermined time period has elapsed since the computation resource is added to the releasing queue.

10. The medium according to claim 9, wherein the process further comprises:

if a computation request corresponding to the computation resource added to the releasing queue is received, allocating the computation resource corresponding to the received computation request to the received computation request to execute a computation process corresponding to the received computation request.

11. The medium according to claim 9, wherein the process further comprises:

evaluating reuse value of the computation resource added to the computation queue; and determining a position where the added computation resources is added to the releasing queue.

12. The medium according to claim 9, wherein the process further comprises:

if reuse value of the computation resource is lower than predetermined value, placing the computation resource which is being activated in the stop state.

13. The computation resource control apparatus according to claim 4, wherein the reuse value of the computation resource is calculated based on a probability that a computation request occurs that corresponds to the computation resource added to the releasing queue, and an elapsed time from a previous computation request that corresponds to the computation resource added to the releasing queue.

* * * * *